United States Patent [19]

Drori

[11] Patent Number: 4,614,581
[45] Date of Patent: Sep. 30, 1986

[54] BACKWASHABLE FILTER

[76] Inventor: Mordeki Drori, 89 Zahal Street, Kiron, Israel

[21] Appl. No.: 599,261

[22] Filed: Apr. 11, 1984

[30] Foreign Application Priority Data

Apr. 14, 1983 [IL] Israel .................................. 68403

[51] Int. Cl.⁴ .............................................. B01D 41/00
[52] U.S. Cl. .................................................... 210/108
[58] Field of Search .............. 210/107, 108, 138, 392, 210/393; 55/283, 294, 351; 137/117, 624.11

[56] References Cited

U.S. PATENT DOCUMENTS

| | | | |
|---|---|---|---|
| 2,178,463 | 10/1939 | Bahnson | 55/272 |
| 3,018,791 | 1/1962 | Knox | 137/458 |
| 3,400,734 | 9/1968 | Rosenberg | 137/624.11 |
| 3,460,557 | 8/1969 | Gallant | 137/624.11 |
| 4,042,504 | 8/1977 | Drori | 210/107 |
| 4,045,345 | 8/1977 | Drori | 210/107 |
| 4,271,018 | 6/1981 | Drori | 210/107 |
| 4,278,540 | 7/1981 | Drori | 210/108 |
| 4,295,963 | 10/1981 | Drori | 210/108 |
| 4,312,374 | 1/1982 | Drori | 137/469 |

*Primary Examiner*—Bernard Nozick
*Attorney, Agent, or Firm*—Benjamin J. Barish

[57] ABSTRACT

A backwashable filter comprises a filter body, a backwash nozzle having an inlet adjacent to the upstream surface of the filter body, and a control device sensing a pressure drop across the filter body and effective to initiate a backwash operation by connecting the backwash nozzle to the atmosphere and effecting relative rotary movement between the filter body and the backwash nozzle. The control device includes further means effective, upon sensing a higher pressure drop, to automatically terminate the backwash operation.

25 Claims, 6 Drawing Figures

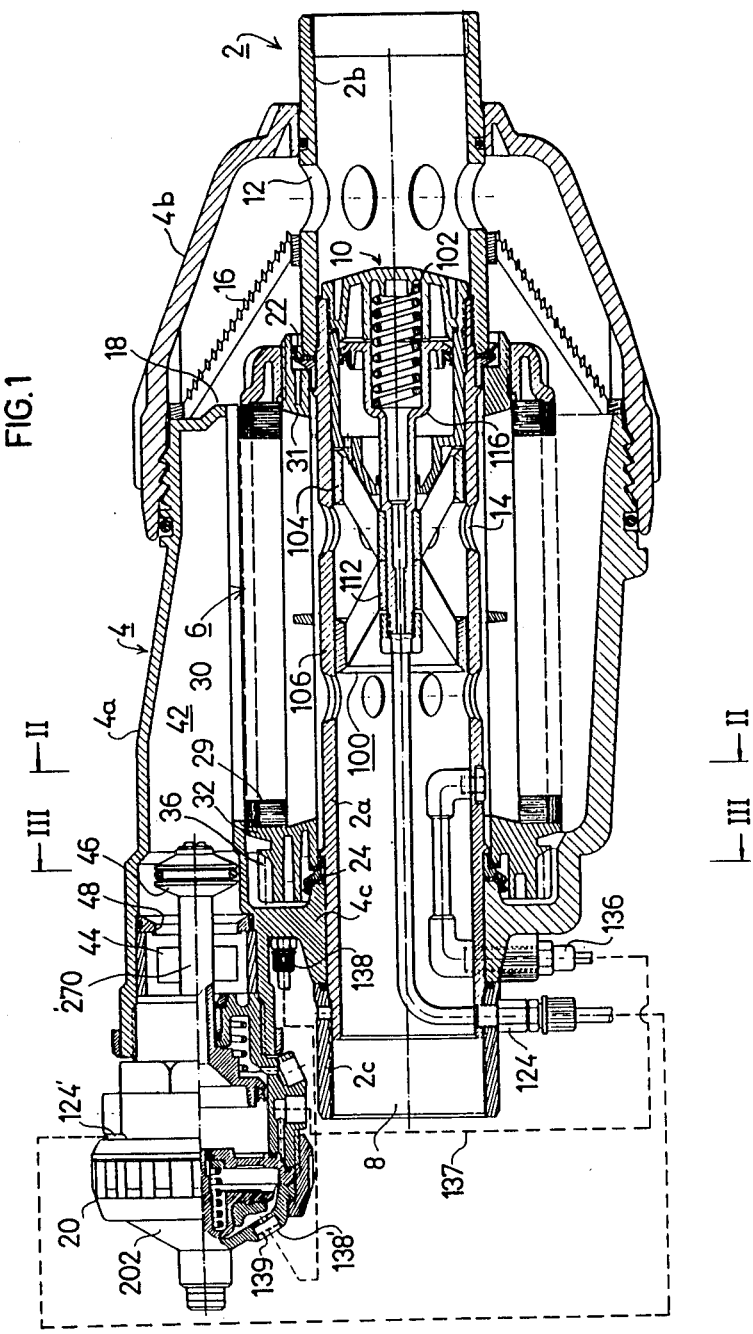

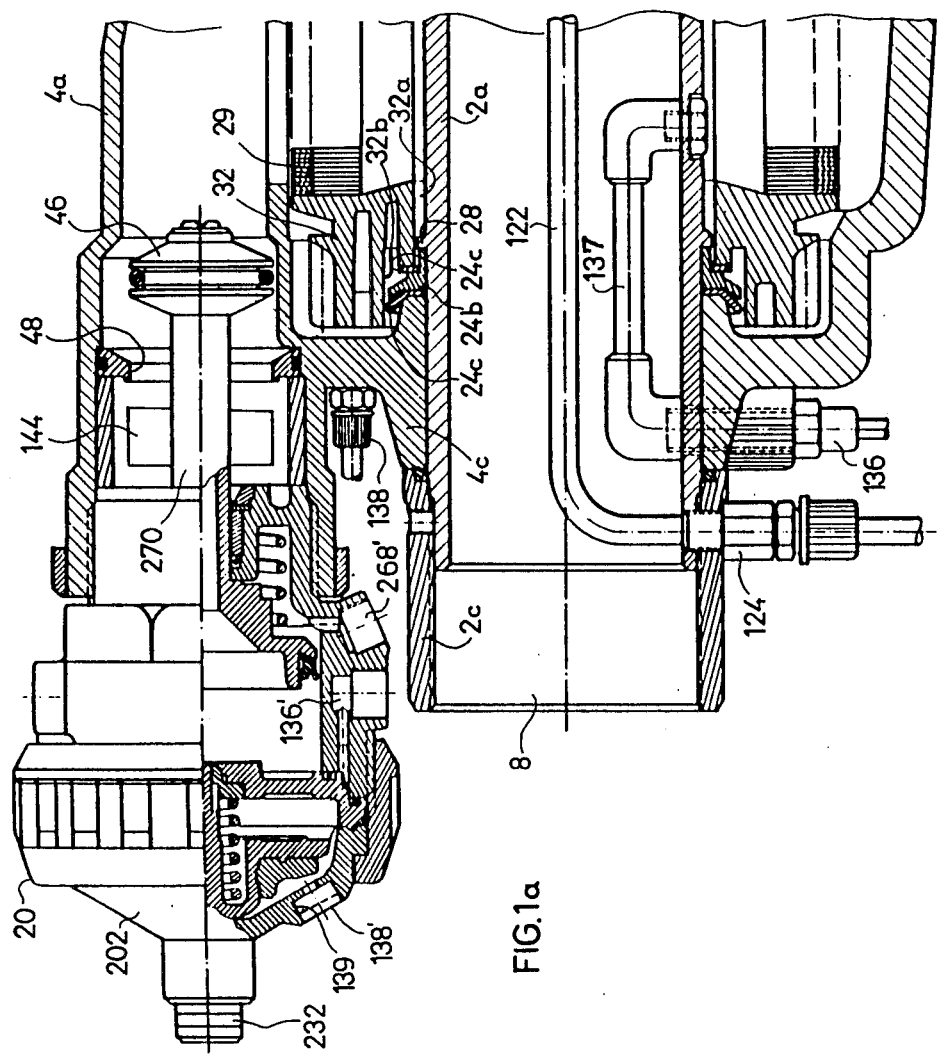

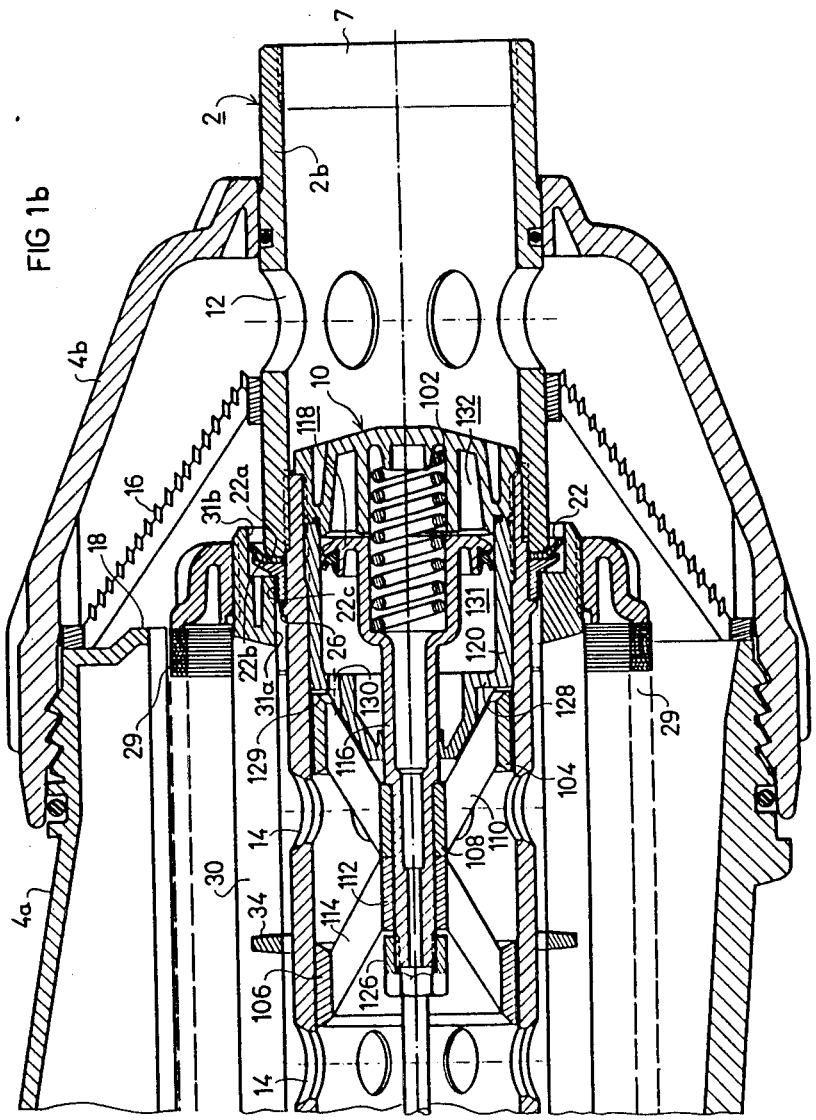

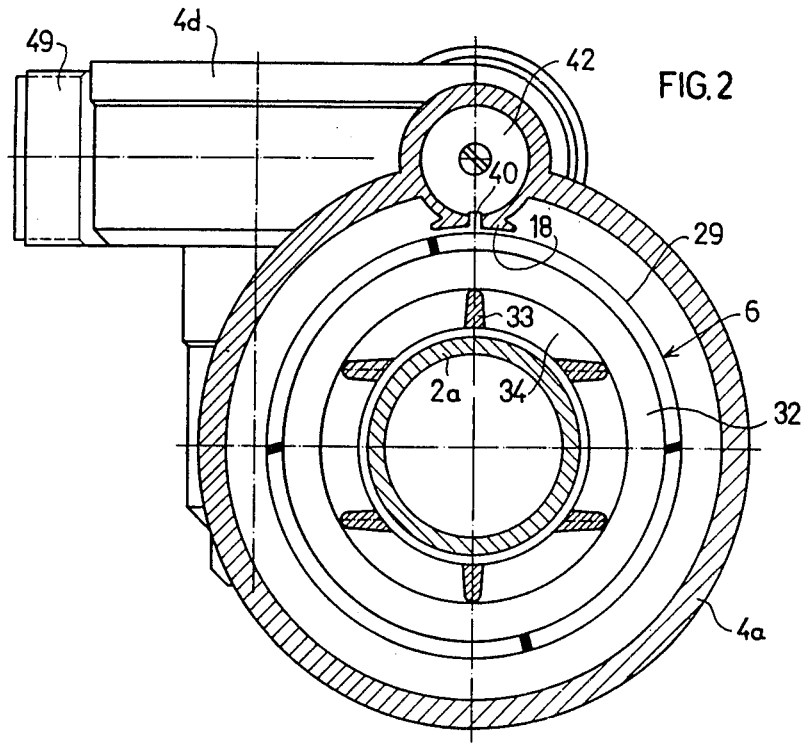
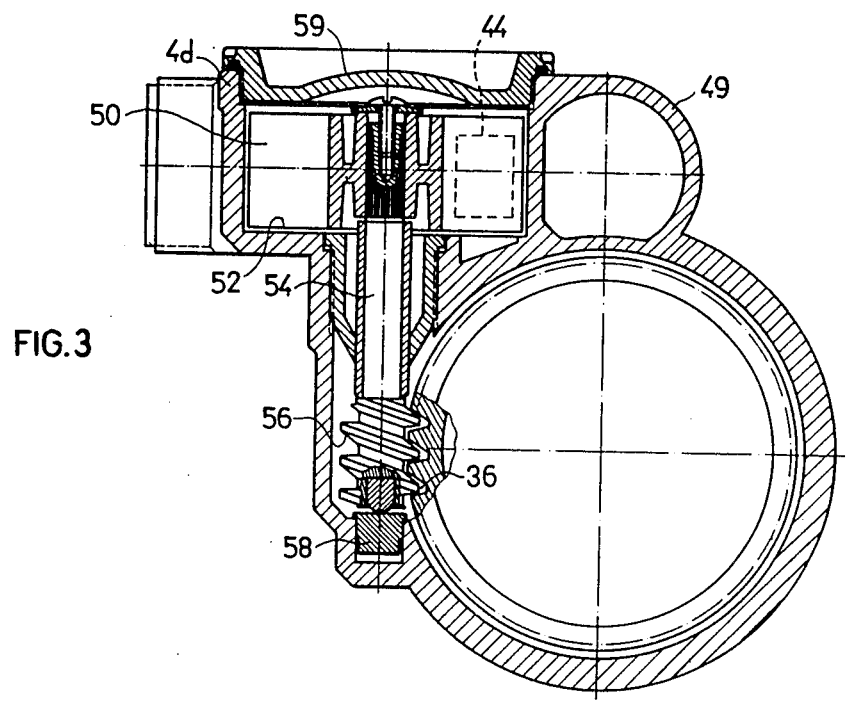

BACKWASHABLE FILTER

BACKGROUND OF THE INVENTION

The present invention relates to backwashable filters, and also to a control device particularly useful in such filters.

The invention is particularly useful in backwashable filters of the type described in my prior Ser. No. 74,525 (Pat. No. 4,271,018). Such filters include a housing having an inlet connectable to an upstream fluid pipe and an outlet connectable to a downstream fluid pipe, a filter body having an upstream surface facing the housing inlet, a backwash nozzle within the housing and having a nozzle inlet disposed adjacent to the upstream surface of the filter body, and a control device for sensing the pressure drop across the filter body and effective, upon sensing a pressure drop of a predetermined magnitude, to initiate a backwash operation by connecting the backwash nozzle to the atmosphere and effecting relative rotary movement between the filter body and the backwash nozzle. In the preferred embodiment of the invention described in the above-cited Patent specification, the filter body is rotated with respect to the nozzle during the backwash operation, the energy for effecting this rotation coming from the energy of the fluid flowing through the backwash nozzle during the backwash operation.

An object of the present invention is to provide a number of improvements to backwashable filters, and particularly to the type of backwashable filters described in the above-cited Patent Specification. Another object of the invention is to provide a control device particularly useful in backwashable filters of the foregoing type.

BRIEF SUMMARY OF THE INVENTION

According to one aspect of the present invention, there is provided a backwashable filter of the foregoing type characterized in that the control device includes further means effective, upon sensing a pressure drop across the filter body of a second predetermined magnitude, higher than the magnitude of the first-mentioned pressure drop, to automatically terminate the backwash operation.

According to another aspect of the invention, the control device may include still further means effective, upon sensing the elapse of a predetermined maximum time interval, after the initiation of a backwash operation, to automatically terminate the backwash operation.

Thus, if a condition should be incurred wherein the filter cannot automatically clean itself during a backwash operation (e.g. because of a malfunction preventing the relative rotation between the filter body and the cleaning nozzle, or because of the filter being suddenly subjected to an excessive amount of foreign particles), the filter will automatically terminate the backwash operation and thereby prevent an excessive flow of the fluid through the backwash nozzle and an unnecessary wastage of this fluid, e.g. water, when the filter is used for removing foreign particles from the water in a water irrigation system.

According to a further aspect of the invention, the backwash filter further includes flow control means effective, upon initiating a backwash operation, to restrict the flow through the filter housing outlet. The latter flow control means comprises a valve assembly including a displaceable member, a valve member coupled thereto for controlling the flow of the fluid from the downstream surface of the filter body to the housing outlet, a spring urging the displaceable member in the direction causing the valve member to reduce the flow to the housing outlet, means for applying the fluid pressure at a point downstream of the filter body for urging the displaceable member in the direction causing the valve member to increase the flow to the housing outlet, and means controlled by the control device for applying, during a backwash operation, the fluid pressure at a point downstream of the filter body to the displaceable member in the direction causing the valve member to reduce the flow of the fluid to the housing outlet.

Such a feature provides a number of important advantages, including: (1) maintaining the pressure during the backwash operation to assure sufficient energy for effecting the relative rotation between the filter body and the backwash nozzle; (2) reducing the flow through the filter (and therefore the rate of dirt build-up on the upstream surface of the filter) during the backwash operation, to better assure removing this dirt during the backwash operation; (3) cushioning the shock applied to the line when the line is first filled with the pressurized fluid, and also when a backwash operation is terminated and the filter is restored to its normal filtering functions. Particularly for the latter reason, the valve assembly which is actuated during a backwash operation preferably does not completely shut-off the flow of the fluid through- the filter outlet; rather, it substantially restricts the flow so that there will still be some flow, but of a much smaller rate, also during the backwash operation. It has been found that providing the foregoing arrangement, wherein the downstream filter pressure is continuously applied to one side of the displaceable member in opposition to the spring, but is also applied to the opposite side of the displaceable member in aid of the spring during the backwash operation, enables the valve assembly to efficiently attain all three of the above-described advantages.

According to a further feature of the present invention, the filter housing includes an outer section, an inner tubular section formed with inlet openings communicating with the housing inlet and outlet openings communicating with the housing outlet, and a deflector between the two openings constraining the fluid to flow from the inlet openings through the filter body and out through the outlet openings; the tubular housing section including a main rigid pipe threadedly receiving an outer rigid pipe on each of its opposite ends; the main rigid pipe having integrally formed thereon an annular shoulder on each of its two opposite ends; and a rotary-bearing seal clamped between the annular shoulder on each of the two ends of the main rigid pipe and the outer pipes when threadedly attached thereto, each of the rotary-bearing seals comprising a conical plastic disc seal and a retainer ring, each of the retainer rings being received on the side of the rotary-bearing-seal engaging the respective annular shoulder of the main rigid pipe and including a hard annular surface rotatably supporting the filter body while the plastic disc seal engages the filter body to effect a seal with respect thereto during the rotation of the filter body.

According to a still further feature of the present invention, the control device includes a housing and a manipulatible member disposed within the housing and passing through an opening therein so as to be manually movable to one of a plurality of positions including a first position wherein it initiates a backwash operation and a second position wherein it terminates the backwash operation.

According to a still further aspect of the invention, the displaceable member within the control device housing is spring-biased to the home position when the pressure drop across the filter body is below a first predetermined magnitude, but is automatically moved to the first actuated position when the pressure drop rises to the first predetermined magnitude, and to the second actuated position when the pressure drop rises to a second, higher, predetermined magnitude.

The invention also provides a differential-pressure control device particularly useful in the backwash nozzle described herein.

Further features and advantages of the invention will be apparent from the description below.

BRIEF DESCRIPTION OF THE DRAWINGS

The invention as herein described, by way of example only, with reference to the accompanying drawings, wherein:

FIG. 1, also shown in enlarged form in FIGS. 1a, 1b, illustrates one form of backwashable filter constructed in accordance with the present invention;

FIGS. 2 and 3 are transverse sectional views along lines II—II and III—III, respectively, of FIG. 1.

DESCRIPTION OF A PREFERRED EMBODIMENT

General Construction

Figure 4:
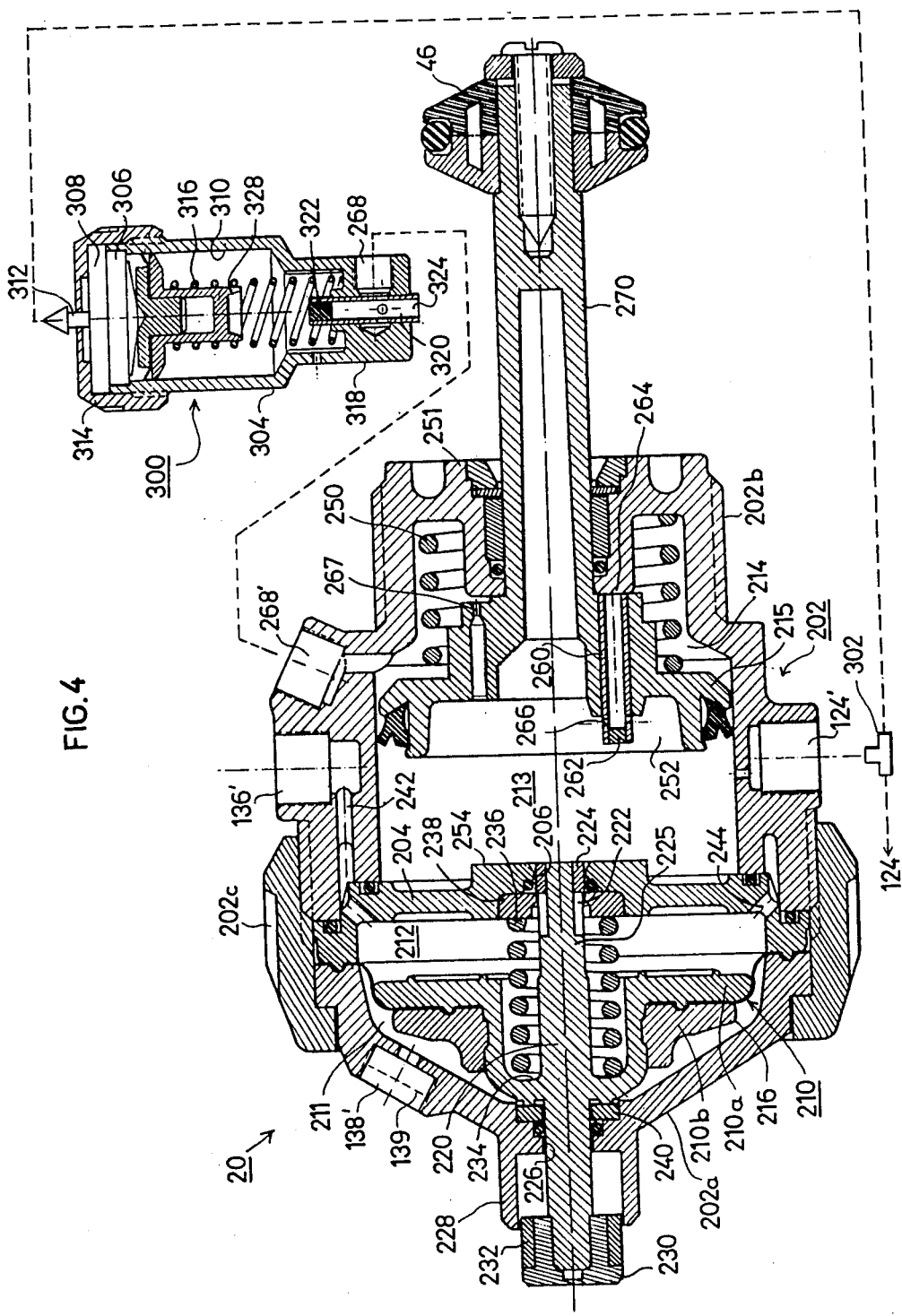
FIG. 4 is an enlarged longitudinal sectional view illustrating the details of construction of the control device in the backwashable filter of FIG. 1.

The backwashable filter illustrated in the drawings is of the in-line type, such as described in my above-cited prior Patent Specification, particularly useful in a water irrigation system for removing the dirt particles from the water before they can reach the irrigating devices, such as sprinklers, sprayers or drippers.

The filter housing includes an inner tubular section 2 and an outer, generally cylindrical, section 4 for enclosing the filter body 6 between the two sections. End 7 of the tubular section 2 constitutes the housing inlet and is connectable to the upstream pipe, and the opposite end 8 constitutes the outlet and is connectable to the downstream pipe. Tubular section 2 further includes a deflector 10 plugging the inlet side of tubular section 2 thereby constraining the flow of the water through a plurality of inlet openings 12 formed on one side of the deflector, through the filter body 6 in the radially-inward direction, and out through outlet openings 14 formed on the other side bf the deflector. The housing further includes a conical coarse filter 16 for removing the large particles before reaching the main filter body 6. The main filter body 6 is automatically cleaned, whenever necessary, by a backwash nozzle 18 disposed adjacent to the upstream (outer) surface of the filter body, the cleaning being effected during a backwash operation under the control of a control device 20.

Briefly, the control device 20 continuously senses the pressure drop across the main filter body 6, which pressure drop increases with the accumulation of dirt particles on the outer (upstream) surface of the filter body. When the pressure drop has reached a predetermined magnitude, indicating an undue accumulation of particles on the upstream surface of the filter body 6, the control device initiates a backwash operation during which two things occur: first, the cleaning nozzle 18 is connected to the atmosphere so as to produce a reverse flow of the water through the filter body 6; secondly, relative rotation between the filter body and the backwash nozzle is effected, by the kinetic energy of the water flowing through the backwash nozzle, to enable the backwash nozzle to clean the complete outer surface of the filter body. In the embodiment of the invention described herein, the filter body 6 is rotated with respect to the backwash nozzle 18.

Backwash nozzle 18 is fixed to the main section 4a of the outer housing 4, the latter section threadedly receiving an end collar 4b, with the coarse filter 16 clamped between these two sections. The control device 20 is carried at the end of housing section 4a opposite to that closed by collar 4b. Since the filter illustrated in FIG. 1 is connected in-line, the main physical forces to which the filter is subjected when connected in a line are applied to the inner tubular section 2, rather than to the outer housing section 4; therefore the outer housing section 4 may be made of plastic material, but the inner tubular section 2 should be made of strong rigid material, such as metal, capable of withstanding high physical forces.

The inner tubular section 2 includes a main pipe 2a and two end pipes 2b, 2c threadedly received at each of the opposite ends of the main pipe. The end pipes 2b, 2c, when threaded onto the main pipe 2a, are also used for clamping a rotary-bearing-seal 22, 24, at each of the opposite ends of the main pipe 2a for supporting the main filter body 6 in a low-friction rotatable manner, while at the same time effecting a seal between the outer upstream surface and the inner downstream surface of the filter body.

For purposes of mounting the rotary-bearing seals 22, 24, the main pipe section 2a is integrally formed with an outwardly-projecting annular shoulder 26, 28, at each of its opposite ends. Each of the rotary-bearing-seals 22, 24, includes a conical plastic disc 22a, 24a, of low-friction material, e.g. "Teflon" (Reg. TM), and a retainer ring 22b, 24b, of hard self-lubricating plastic material, e.g., nylon or an acetyl resin, having smooth annular surfaces. These rings are located on the side of the seal engaging the respective shoulder 26, 28. In seal 22, the conical disc 22a is directly engaged by the end pipe 2b firmly clamping the seal between it and shoulder 26; whereas in seal 24, its end pipe 2c engages a section 4c of the outer cylindrical housing 4, which latter section engages the conical sealing disc 24a and presses its retainer ring 24b against its respective annular shoulder 28.

The rotary filter body 6 comprises a stack of annular filter discs 29 supported on an open cylindrical cage 30 rotatably received on the rotary-bearing seals 22, 24. Filter discs 29 may be of any known construction, including ribbed side faces which, when the discs are clamped together in contacting relationship as shown in FIG. 1, form a plurality of narrow passages which separate the foreign particles from the water as it flows through the filter from the outer upstream surface to the inner downstream surface. The separated foreign particles thus accumulate on the outer upstream surface of the discs 29.

Tubular cage 30 is of plastics material and includes a pair of end rings 31, 32 integrally formed with a plurality (e.g. six) of longitudinally-extending ribs 33 and with a central supporting ring 34. The filter discs 29 are supported in stacked relationship on the longitudinal ribs 33 and are spaced thereby from the outer face of the main rigid pipe 2a and from the outlet openings 14 formed through that pipe. Both of the end rings 31, 32 are formed with first smooth annular faces 31a, 32a which engage the plastic discs 22a, 24a, and second smooth annular faces 31b, 32b which engage the hard annular surfaces of the retainer rings 22b, 24b of the rotary-bearing seals 22, 24. The retainer rings thus support the filter body 6 for rotation, while the plastic discs effect the seals.

End ring 32 is further formed with teeth 36 engaged by a gear of a drive unit which is controlled by control unit 20 during a backwash operation to effect the rotation of the filter body 6 as will be described more particularly below.

As shown particularly in FIG. 2, the inlet end of cleaning nozzle 18 is located adjacent to the outer face of the filter body 6 and conforms substantially to the curvature of its filter discs 29, Nozzle 18 is formed with a slit 40 which extends longitudinally for the complete length of the nozzle and leads into a chamber 42. Chamber 42 also extends the length of the main housing section 4a to the end section 4c receiving the control device 20. End 4c of housing section 4a includes an extension. 4d (FIG. 2) communicating with chamber 42 via an opening (FIG. 1).

During the normal filtering operation of the filter, the communication between chamber 42 and opening 44 is blocked by a valve member 46 of control unit 20, seated within a valve opening 48 between chamber 42 and opening 44. In order to initiate the backwash operation, control unit 20 is actuated to move valve member 46 out of opening 48, as shown in FIG. 1, thereby establishing communication between chamber 42 of the backwashed nozzle 18 and the outlet opening 44, the latter venting chamber 42 to the atmosphere via a dirt-water outlet 49 (FIGS. 2,3) to produce a reverse flow of water through the filter body 6. During this outflow of water through outlet 49, a drive unit located within housing section 4d utilizes the kinetic energy of this outletted water to rotate the filter body 6 with respect to the backwash nozzle 18.

The drive unit for rotating the filter body 6 comprises a plurality of vanes 50 located within a cylindrical compartment 52 formed in housing section 4d. Compartment 52 communicates with opening 44 leading to the backwash nozzle chamber 42 eccentrically with respect to the axis of chamber 52 so that the vanes 50 rotably supported within chamber 52 are successively impinged by the water flowing through opening 44 to its outlet 49, thereby rotating the vanes. The vanes 50 are secured to a shaft 54 formed at its lower end with threads 56 meshing with threads 36 formed in end ring 32 of the open cage 30 supporting the filter discs 29 of the filter body 6. The filter body is thus rotated by the kinetic energy of the water flowing from the backwash nozzle 18 to the atmosphere via opening 44 and outlet 49. The threaded end of shaft 54, which serves the function of a worm gear meshing with teeth 36 of the filter body 6, bears against a bearing member 58, and the opposite end of compartment 52 is closed by a removable cover plate 59.

Filter Outlet Valve Assembly (100)

Deflector 10 disposed within the inner tubular section 2 of the filter housing is part of a valve assembly, generally designated 100, including a biasing spring 102 which controls the flow of the water through the outlet openings 14 between the downstream side of the filter body 6 and the housing outlet 8. In the embodiment illustrated in FIG. 1, the outlet openings 14 are arranged in two annular series, and therefore valve assembly 100 is provided with two annular rings 104, 106, each cooperable with one of the annular series of outlet openings 14. Ring 104 is secured to an inner ring 108 by a plurality of ribs 110, and ring 106 is secured to an inner ring 112 also by a plurality of ribs 114. The two inner rings 110 and 112 are in turn received on a stem 116 secured to a displaceable member or piston 18 movable within a cylinder 120 threadedly received within the main pipe 2a of the filter housing section 2 on the inner side of deflector 10, the latter also being threadedly received within pipe 2a. Spring 102 is interposed between a cylindrical socket formed in piston 118 and a corresponding socket formed in deflector 10.

Stem 116 of piston 118 is hollow and is connected via a flexible tube 122 to an outlet coupling 124 externally of the filter housing, tube 122 being secured to the end of stem 116 by a threaded nut 126. Sleeve 120, in which piston 118 is displaceable is formed with an end wall 128 which is centrally apertured in order to accomodate stem 116 of piston 118. This end wall 128 is further formed with an annular shoulder 129 and with a small opening 130, for purposes to be described below.

It will be seen that piston 118 movable within the cylindrical sleeve 120 defines a first chamber 131 on the side facing end wall 128 and a second chamber 132 on the side facing the deflector 10. Piston 118 is biased by spring 102 in the direction moving the annular rings 104, 106 in the direction tending to close or restrict the outlet openings 14 downstream of the filter body 24. Preferably, no seals are provided between rings 104, 106 and openings 14, so that even when these rings are aligned with these openings, there is still some flow through the openings to the outlet 8 of the filter housing.

It will further be seen that acting, together with spring 102 on the face of piston 118 tending to move rings 104, 106 to close openings 14, is also the pressure within chamber 132, which pressure is derived from the outlet coupling 124 via tube 122 and the interior of the hollow stem 116. Acting in the opposite direction, i.e., opposite to the force of spring 102 and the pressure within chamber 132, is the pressure within chamber 131. The pressure in this chamber 131 is substantially equal to the filter outlet pressure, which pressure is communicated to chamber 131 via opening 130 through the end wall 128 of sleeve 120.

Outlet coupling 124 which determines the fluid pressure within the chamber 132, is coupled to a port 124' in the control device 20. A further coupling 136 in the filter housing is connected via tube 137 to the downstream side of the filter body 6 and to another port 136' from the control device 20. The filter housing includes a further coupling 138 connected to the upstream side of the filter body 6, which further coupling is connected to a port 138' in the control unit 20. Since the water thus communicated to port 138' is upstream of the main filter body 6, it may be desirable to provide port 138' with a screen 139 to block any dirt particles not removed by the coarse filter 16.

Control Unit 20 (FIG. 4)

Control Unit 20, as shown particularly in FIG. 4, includes a housing 202 whose interior is divided into two compartments by means of a partition or wall plate 204 formed with a central opening 206 permitting communication between the two compartments. To facilitate assembly and disassembly, the housing is formed of two sections 202a, 202b secured together by a nut 202c with partition or wall plate 204 clamped in between.

Disposed within the compartment on one side of partition wall 204 is a displaceable member 210 dividing that compartment into two chambers 211 and 212. The other compartment on the opposite side of partition wall 204 is also divided into two chambers 213, 214 by a second displaceable member 215. The amount of displacement of member 210 is relatively small, and therefore it includes a diaphragm 216, clamped at its outer periphery between the two housing sections 202a, 202b, and at its inner periphery between the two displaceable member sections 210a, 210b. This displaceable member acts as a differential pressure sensor for sensing the pressure drop across the filter body 6, i.e., the difference in pressure between its upstream and downstream sides, and moves a control valve in response thereto to control the flow through opening 206 of the partition plate 204. Displaceable member 215, however, controls the displacement of the main valve member 46; its displacement is accordingly substantially larger, and therefore member 215 is in the form of a piston movable within a cylindrical portion of the sensor housing 202.

With respect to displaceable member 210, it will be seen that its main section 210a is formed with a central stem 220 aligned with central opening 206 through the partition wall 204. The inner end of stem 220 is of reduced cross-sectional area, shown at 222, so that its cross-sectional area is less than that of opening 206. The inner tip of stem 220 receives a ring 224 to increase the cross-sectional area of this inner tip to equal that of opening 206 such that the stem includes an inner section (that defined by ring 224) of the same cross-sectional area as opening 206, an adjacent section 222 of smaller cross-sectional area than opening 206 (which section is of longer axial length than the axial length of the opening), and a third section 225 (that defined by the next adjacent section of the stem) of the same (or greater) cross-sectional area as opening 206.

The outer end of stem 220 projects through an opening 226 formed in the control unit housing 202 and is circumscribed by a cylindrical collar 228. This end of stem 220 projecting externally of the sensor housing is provided with a cap 230 carrying a plurality of differently-marked (e.g., differently colored) rings 232, for a purpose to be described below.

Section 210a of displaceable member 210 is formed with a socket 234 for receiving a coiled spring 236 between it and an abutment ring 238 carried by the partition wall 204. Spring 236 thus biases stem 220 further through the housing opening 226, the position of the stem being limited by another abutment member 240 engageable with the opposite side of socket section 234 of the displaceable member 210.

As described earlier, port 138' is connected via coupling 138 of the filter to the pressure at the upstream side of the filter body 6; therefore the pressure within chamber 211 will be that at the upstream side of the filter body. The pressure in chamber 212 at the opposite side of displaceable member 210, however, will be that at the downstream side of the filter body 6, this pressure being transmitted to chamber 212 via coupling 136 of the filter housing, port 136' of the control device, a bore 242 through the control device section 202b, and a bore 244 through the partition wall 204.

It will thus be seen that when the differential-pressure between the upstream and downstream sides of the main filter body 6 are less than a predetermined magnitude (indicating a relatively clean filter), displaceable member 210 will be located, by virtue of spring 236, in the FIG. 4 illustrated position wherein ring 224, at the end of stem 220, is disposed within opening 206 through the partition wall 204, thereby preventing any flow from chamber 212 on one side of the partition wall to chamber 213 on the opposite side of the partition wall. However, when the differential pressure rises to a predetermined magnitude, member 210 will be displaced, against the action of spring 236, so as to move the reduced cross-sectional area 222 of its stem 220 within opening 206 through the partition wall 204, thereby establishing communication between the two chambers 212 and 213. However, should the differential pressure further increase in magnitude, displaceable member 210 will be moved further against the action of spring 236 to bring section 225 of the stem, of the same (or greater) cross-sectional area as opening 206, into the latter opening, thereby again terminating the communication between the two chambers 212, 213 on the opposite sides of the partition wall 204.

Piston 215, movable in the compartment on the opposite side of partition wall 204, is biased towards the partition wall by a coil spring 250 interposed between the piston and the end wall 251 of the control device housing 202. Thus, spring 250 tends to contract chamber 213 defined by the piston 215 and the partition wall 204. Piston 215 is formed with a cylindrical recess 252 receivable within a cylindrical embossment 254 formed in partition wall 204, and of smaller diameter than recess 252, when the piston is urged against partition wall 204 by spring 250.

Piston 215 is further formed with an axial bore extending therethrough and slidably receiving a cylindrical sleeve 260, which sleeve is open at one end but is closed at the opposite end by a plug 262. Sleeve 260 is of greater length than the thickness of the piston at this location, and is adapted to engage an annular abutment 264 formed on the inner face of end wall 251 when the piston is moved to its extreme extended position wherein chamber 213 is of maximum volume and chamber 214 at the opposite side of the piston is of minimum volume. When sleeve 261 engages abutment 264, the end of the sleeve carrying plug 262 projects into chamber 213. This projecting end of the sleeve is formed with a radially extending bore 266 which establishes communication between chambers 213 and 214 on the opposite sides of the sleeve.

Piston 215 is further formed with a small bore 267 to provide a slow-acting vent between the two chambers on the opposite sides of the piston.

The previously-mentioned port 124' in the control device housing 202, connected to coupling 124 of the filter housing, leads to the compartment on the side of the partition wall 204 within which piston 215 is movable. Thus, in the illustrated extended position of piston 215, this port 124' communicates with chamber 213, but in the retracted position of the piston, wherein the piston is moved towards or into contact with partition wall 204, this port 124' communicates with chamber 214 on the opposite side of the piston.

Control device housing 202 further includes an additional port 268 leading to the atmosphere directly, or via a timer 300, port 268 always communicating with chamber 214.

Piston 215 includes a stem 270 carrying the main valve member 46 which as described earlier, is movable with respect to valve opening 44 to initiate or terminate a backwash operation. Thus, in the retracted position of piston 215, wherein it is in contact with partition wall 204 and chamber 213 is at its minimum volume, the main valve member 46 is seated within valve opening 44 so that no backwash operation is performed; but when the displaceable member 215 is moved to its extended position, away from partition wall 204, valve member 46 is unseated from valve opening 44 to thereby connect chamber 42 of the backwash nozzle 18 to the atmosphere to initiate a backwash operation.

Timer 300 (FIG. 4)

Timer 300 illustrated in FIG. 4 may be used in order to terminate a backwash operation if, after a predetermined time interval, the filter has not sufficiently cleaned itself during the backwash operation so as to reduce the pressure drop across the filter body 6 to one below the predetermined magnitude. When the timer is used, one side of the timer is coupled, via a Y-fitting 302, to port 124' of the control device 20 and to coupling 124 of the filter housing; and the opposite side 268 of the timer is connected to port 268' of the control device. The timer operates to normally connect port 268' to the atmosphere, but if, after a predetermined time interval following the initiation of the backwash operation (e.g., 20 seconds) the backwash operation has not automatically terminated, the timer closes port 268' to block the connection of chamber 214 to the atmosphere and thereby to terminate the backwash operation.

Timer 300 thus includes a housing 304 having a piston 306 movable therein and dividing the interior of the housing into two chambers 308, 310, on opposite sides of the piston. Chamber 308 includes an inlet connector 312 connected to the previously-mentioned fitting 302. Piston 306 is normally urged against cap 314, defining one end wall of the timer housing, by means of a coil spring 316 interposed between piston 306 and the the opposite end wall 318 of the housing.

End wall 318 of the timer housing is formed with a bore slidably receiving a sleeve 320 which is closed at one end by a plug 322, the sleeve being open at the opposite end. Sleeve 320 is formed with an opening 324 which, in the normal illustrated position of the sleeve, is in alignment with bore 268 connected to port 268' of the control device 20. However, if a predetermined time interval has elapsed after the start of a backwash operation, which time interval is determined by the time it takes for stem 328 of piston 306 to engage the inner, plugged end of sleeve 320, the latter sleeve is moved outwardly by stem 328 so as to interrupt this connection of port 268' to the atmosphere via the sleeve, which results in the termination of the backwash operation, as will be described more particularly below.

Operation of the Filter

The illustrated backwash filter and control device will now be described, first without the use of timer 300 in which case port 268' is directly connected to the atmosphere, and then with the use of the timer in which case the timer acts to terminate the connection of port 268' to the atmosphere after the elapse of a predetermined time interval and thereby to terminate the backwash operation if it has not been earlier terminated.

First, it will be be assumed that the filter has been connected to the fluid supply line, e.g. a water irrigation supply line, but the line has not yet been filled. Under this condition, spring 102 within the valve assembly 100 urges the rings 104, 106 to cover the outlet openings 14 at the outlet end of the tubular filter housing section 2; spring 236 in the control unit 20 urges the differential pressure sensor member 210 to its normal position wherein ring 224 at the end of its stem 220 blocks communication between the two chambers 212, 213 on opposite sides of the partition wall 204; and spring 250 urges piston 252 to its fully retracted position wherein it is against the partition wall 204 and its chamber 213 is at minimum volume, In this initial position of piston 252, its control sleeve 260 will have been moved by embossment 254 such that the plugged end 262 of the sleeve blocks communications between chambers 213 and 214. Also, in this initial position of piston 215, its valve member 46 is received within valve opening 44, thereby blocking dirty-water outlet 49 and preventing a backwash operation.

When the line pressure is turned-on, pressurized water flows from the inlet 7 of the filter housing through its inlet openings 12, through the coarse filter 16, radially inwardly through the filter body 6, and to the outlet openings 14. Although the circular rings 104, 106 are aligned with these openings under the influence of spring 102 as described earlier, nevertheless some filtered water still flows through them since no seal is provided, this filtered water flowing out through the filter outlet 6 to the downstream pipe. The pressure in the downstream line thus gradually builds up. This pressure is communicated via opening 130 to chamber 131 of the valve assembly 100, until the pressure builds up to overcome the action of spring 102, thereby moving piston 118 to the fully opened position of rings 104, 106 with respect to openings 14.

Thus, in this initial starting condition, rings 104, 106 are moved to fully open the outlet openings 14 by the pressure within chamber 131. It has been found that by applying to chamber 131 the pressure downstream of the valve assembly 100 (this being effected by bore 130), a positive and rapid opening (and also closing) of the valve assembly is produced. That is, as soon as this downstream pressure starts to increase by the slight movements of the rings 104, 106, this increase in the outlet pressure is immediately transmitted to chamber 131 to aid in the further opening of the rings, which causes the downstream pressure to further increase according to a "snowballing" effect. The same "snowballing" effect applies during the movement of the rings 104, 106 in the opposite direction to cover openings 14 when the pressure downstream of the valve assembly 100 drops.

If for some reason, the downstream pressure does not build up to a predetermined minimum value sufficient to move rings 104, 106 away from openings 14, the flow through the filter will be very low. This provides protection against the wastage of water should the downstream line have bursted or should there be any other reason preventing the normal build-up of pressure in the line when turning it on. In addition, this arrangment cushions the shocks that may be applied to the line when the line is initially filled.

After the line pressure has thus been built up, and piston 118 has moved so that its rings 104, 106 fully uncover openings 14, the filter operates according to its normal filtering mode wherein the dirt particles in the inletted water are separated by the filter body 6 and accumulate on its outer surface, this being the upstream surface of the filter body.

As the dirt thus accumulates, the pressure drop across the filter body 6 increases, thereby reducing the pressure at the downstream side (inner face) of the filter body. This downstream pressure is transmitted, via port 136', to chamber 212 of the control unit 20 so that as the pressure differential increases, the upstream pressure in chamber 211 tends to move stem 220 of displaceable member 210 through opening 206 in the partition wall 204, against the action of spring 236. When this differential pressure reaches a predetermined magnitude, indicating an undue amount of dirt accumulating on the outer face of the filter body 6, the reduced cross-sectional areas section 222 of stem 220 becomes located within opening 206, which thereby establishes communication between chambers 212 and 213 on opposite sides of the partition wall 204. When this occurs, the downstream-filter pressure in the chamber 212 is communicated to chamber 213, thereby causing piston 215 to move away from the partition walls 204 against the action of spring 250. This movement of piston 215 causes it to move its valve member 46 away from valve opening 44 in the filter housing, thereby connecting chamber 42 of the backwash nozzle 18 to the atmosphere via outlet 49, which initiates a backwash operation. During this backwash operation, a reverse water flow is produced through the filter body 6 and the backwash nozzle 18 out through outlet 49. During this outflow of the dirty water, the water impinges on the vanes 50 (FIG. 3), which vanes rotate shaft 54 and its gear 56, the latter gear meshing with teeth 36 of the filter body 6 to rotate the filter body with respect to the backwash nozzle 18.

Early during the displacement of piston 215 (FIG. 4) which started the backwash operation, the piston passes.port 124', thereby connecting the latter port to chamber 213 of the valve assembly 100, which chamber is subject to the pressure at the filter outlet 8 via opening 130 as described earlier. This pressure is communicated via coupling 124 to chamber 132 of the valve assembly 100, thereby counteracting the filter-downstream pressure at the opposite side of piston 118. Accordingly, spring 102 is now permitted to move the valve assembly 100 so as to bring rings 104, 106 into alignment with openings 14 at the downstream side of the filter body, thereby restricting the flow of the filtered water through these openings and out through the outlet 8. This action of restricting the flow through openings 14 during the backwash operation thus maintains the outlet pressure to assure sufficient energy for rotating the filter body 6 with respect to the nozzle 18 during the backwash operation.

In addition, by decreasing the flow through the filter, it decreases the rate of accumulation of dirt on the filter thereby better assuring that the backwash nozzle will be able to remove the dirt during the backwash operation.

When piston 215 reaches its fully actuated position, wherein chamber 213 is of maximum volume and chamber 214 is of minimum volume, sleeve 266 moveble within the piston engages the annular abutment 264 of end wall 251, thereby shifting the sleeve to the position illustrated in FIG. 4, wherein its plugged end 262 and also its radial bore 266 are disposed within chamber 213, thereby establishing communication between this chamber and the interior of the sleeve. However, the opposite end of sleeve 260 is still in engagement with abutment 264, and therefore there is still no effective communication between chambers 213 and 214 on the opposite sides of the piston.

This is the condition of the control device so long as stem 220 of the differential-pressure sensor member 210 is located with its section 222 disposed within valve opening 206, thereby transmitting the downstream-filter pressure from chamber 212 to chamber 213. However, as soon as the filter body 6 has been sufficiently cleaned by the backwash operation so as to reduce the pressure drop across it the desired amount, differential-pressure sensor 210 moves its stem 220 back to its normal position with section 224 of the stem located within opening 206, thereby terminating the communication between chambers 212 and 213. As soon as this occurs, the slow-acting vent 268 formed through piston 215 starts to vent the pressure within chamber 213 to the atmosphere via chamber 214 and port 268' (assuming the timer 300 is not connected as mentioned above), and after the pressure within chamber 213 has thus dropped sufficiently, spring 250 moves piston 215 away from abutment 264. As soon as the end of sleeve 260 separates from abutment 264, then the pressure within chamber 213 is immediately vented to the atmosphere via the interior of sleeve 260, chamber 214, and port 268', whereupon spring 250 quickly returns piston 215 back to its normal, retracted position, against partition wall 204. As this occurs sleeve 260 is again moved by embossment 254 to bring its plugged end within the bore in piston 215, thereby effectively interrupting the communication between chambers 213 and 214. When piston 215 is thus returned to its fully retraced position against partition wall 204, its valve member 46 is moved back to close opening 44 and thereby to terminate the backwash operation.

The foregoing arrangment, including the slow-acting vent 268', assures that the backwash operation will last for at least one complete rotation of the filter body 6 with respect to the backwash nozzle 18. Thus, the complete outer surface of the filter body will be cleaned, and not just a portion of it. This has been found to be very advantageous over an arrangement wherein the backwash operation is terminated as soon as the differential pressure across the filter body has dropped below the predetermined value, which frequently occurs only when a relatively small portion of the filter body is cleaned and which thereby reduces the overall efficiency of the filter.

After a backwash operation has started it may occur that the pressure at the downstream side of the filter 6 still does not rise, but rather further drops. This might indicate some malfunction in the device which could be caused, for example, by a stone jamming the hydraulic drive unit to prevent rotation of the filter body with respect to the backwash nozzle. This could also be caused by the presence of such a large amount of dirt within the supply line that the filter is incapable of cleaning the filter body 6 faster than the dirt accumulates thereon, despite the fact that the rate of flow through the filter, and thereby the rate of accumulation of dirt thereon, is very substantially reduced by the valve assembly 100 during a backwash operation. In either event, the differential-pressure sensor member 210 is further displaced to bring its enlarged cross-sectional section 225 into opening 206 through the partition wall 204, thereby terminating the communication between chambers 212 and 213. This will also terminate the backwash operation and thereby prevent the wastage of water.

However, when the backwash operation is terminated in the manner described above by the differential pressure across the filter body 6 increasing rather than decreasing, the outlet pressure will continue to drop because of the further accumulation of dirt. This will lower the pressure in chamber 131 of the valve assembly 100 within the filter housing, thereby causing spring 102 to move the valve assembly to bring its rings 104, 106 into alignment with openings 14, to restrict the flow of the water through the filter to the outlet 6. Thus, not only is the backwash operation terminated in this case wherein the differential pressure increases rather than decreases, but also the flow of the water through the filter is substantially reduced and drops to almost zero as the dirt continues to accumulate.

From the foregoing, it will be seen that the differential-pressure sensor 210 may assume any one of three positions, namely: (1) a normal position during the normal filtering mode of the filter wherein its ring 224 is disposed within the partition wall opening 206 to terminate communication between chambers 212 and 213; (2) a first actuated position reached when the differential pressure between the upstream and downstream sides of the filter body 6 rises to a predetermined magnitude to initiate a backwash operation, in which case the reduced-area section 222 of stem 220 is located within opening 206; and (3) a second actuated position reached when the differential-pressure increases to a second predetermined magnitude, higher than the first whereupon the larger cross-sectional section 225 of the stem 220 becomes located within the partition wall opening 206 to again terminate the communication between chambers 212 and 213, resulting in the termination of the backwash operation and also in the restriction or substantial termination of the water flow through the filter body 6. All three of these conditions of the filter are immediately indicated to the observer by the extent of projection of the stem 220 through collar 228 of the control device housing 202, and particularly by the colored rings 232 carried at the end of the stem.

It will also be appreciated that this projection of stem 220 externally of the control device housing not only indicates the state of the filter (i.e. under which condition it is then in, and/or how close it is to initiating a backwash operation), but also may be used for manually controlling the filter to initiate a backwash operation by pressing it to the above-described first actuated position of the stem, or to terminate the backwash operation by further pressing it to the second actuated position, or returning it to its home position.

If it is desired to terminate a backwash operation after the elapse of a predetermined time interval, timer 300 may be used and connected as shown in FIG. 4. Thus, as soon as piston 215 of the control device 20 moves past port 124' at the start of a backwash operation, the pressure in chamber 213 is applied to chamber 308 of timer 300, thereby moving piston 306 downwardly within the housing against spring 316. During this time, port 268' of the control device 20 is vented to the atmosphere via port 268 of the timer and sleeve 320 because of its hole 324 being in alignment with port 268. Thus, port 268' continues to vent chamber 214 to the atmosphere as in the above-described operation of the control unit.

Timer 300 is designed so that, after a predetermined time interval, its stem 328 will engage the end of sleeve 320 to move its hole 324 out of alignment with bore port 268, thereby interrupting this venting of chamber 214 to the atmosphere. This time interval may be, for example, about 20 seconds, and if the backwash operation is not terminated by that time, then this interruption of the venting of chamber 214 to the atmosphere will cause the pressure within the chamber to build up until it becomes sufficiently large to enable spring 250 to move piston 215 away from wall 251, whereupon the pressure within chamber 213 is immediately transferred via sleeve 260 to chamber 214. When this occurs, spring 250 moves piston 215 to its initial position against partition wall 214, thereby moving valve member 46 back into opening 44, terminating the backwash operation.

Should, however, the backwash operation terminate before the elapse of the predetermined time interval, which would be the normal case, then the pressure within chamber 308 is vented to the atmosphere via port 124' and chamber 214 of the filter, whereupon spring 316 will return the piston 306 to its normal position against end wall 314 of timer 300. If, however, the timer 300 has terminated a backwash operation by its piston 306 having been displaced sufficiently to move sleeve 320 as described above, the timer must be manually reset by manually pushing in its sleeve to the illustrated position wherein its hole 324 is aligned with its port 268.

While the invention has been described with respect to one preferred embodiment, it will be appreciated that many other variations, modifications and applications of the invention may be made.

What is claimed is:

1. A backwashable filter including a housing having an inlet connectable to an upstream fluid pipe and an outlet connectable to a downstream fluid pipe, a filter body having an upstream surface facing the housing inlet, a backwash nozzle within the housing and having a nozzle inlet disposed adjacent to the upstream surface of the filter body, and a control device for sensing the pressure drop across the filter body and effective, upon sensing a pressure drop of a predetermined magnitude, to initiate a backwash operation by connecting the backwash nozzle to the atmosphere and effecting relative rotary movement between the filter body and the backwash nozzle; characterized in that said control device includes further means effective, upon sensing a pressure drop across the filter body of a second predetermined magnitude, higher than the magnitude of said first-mentioned pressure drop, to automatically terminate the backwash operation.

2. A filter according to claim 1 wherein said control device includes a housing and a manipulatible member disposed within said housing and passing through an opening therein so as to be manually movable to one of a plurality of positions including a first position wherein it initiates a backwash operation and a second position wherein it terminates the backwash operation.

3. The filter according to claim 1, further characterized in that said control device includes still further means effective, upon sensing the elapse of a predetermined maximum time interval after the initiation of a backwash operation, to automatically terminate the backwash operation.

4. A backwashable filter including a housing having an inlet connectable to an upstream fluid pipe and an outlet connectable to a downstream fluid pipe, a filter body having an upstream surface facing the housing inlet, a backwash nozzle within the housing and having a nozzle inlet disposed adjacent to the upstream surface of the filter body, and a control device for sensing the pressure drop across the filter body and effective, upon sensing a pressure drop of a predetermined magnitude, to initiate a backwash operation by connecting the backwash nozzle to the atmosphere and effecting relative rotary movement between the filter body and the backwash nozzle; characterized in that the control device further includes means for sensing the elapse of a predetermined maximum time interval after the initiation of a backwash operation to automatically terminate the backwash operation.

5. The filter according to claim 4, wherein said control device further includes means for sensing a pressure drop across the filter body of a second predetermined magnitude, higher than the magnitude of said first-mentioned pressure drop, to automatically terminate the backwash operation.

6. The filter according to claim 1,
further including flow control means effective, upon initiating a backwash operation, to restrict the flow through the filter housing outlet.

7. The filter according to claim 6, wherein said flow control means comprises a valve assembly including a displaceable member, a valve member coupled thereto for controlling the flow of the fluid from the downstream surface of the filter body to the housing outlet, a spring urging said displaceable member in the direction causing said valve member to reduce the flow to the housing outlet, means for applying the fluid pressure at a point downstream of the filter body for urging said displaceable member in the direction causing said valve member to increase the flow to the housing outlet, and means controlled by said control device for applying, upon initiation a backwash operation, the fluid pressure at a point downstream of the filter body to the displaceable member in the direction causing the valve member to reduce the flow of the fluid to the housing outlet.

8. A backwash filter including a housing having an inlet connectable to an upstream fluid pipe, and an outlet connectable to a downstream fluid pipe; a filter body having an upstream surface facing the housing inlet, and a downstream surface facing the housing outlet; a backwash nozzle having an inlet disposed adjacent to the upstream surface of the filter body; a drive for effecting relative rotation between said filter body and said backwash nozzle to enable the nozzle to clean the filter body during a backwash operation; a control device sensing the pressure drop across the filter body and effective to initiate a backwash operation when the pressure drop reaches a predetermined magnitude; and a valve assembly between the downstream surface of the filter body and the housing outlet; said valve assembly including a displaceable member, and a valve member coupled thereto for controlling the flow of the fluid from the downstream surface of the filter body to the housing outlet; a spring urging said displaceable member in the direction causing said valve member to reduce the flow to the housing outlet; means for applying the fluid pressure at a point downstream of the filter body for urging said displaceable member in the direction causing said valve member to increase the flow to the housing outlet; and means controlled by said control device for applying, upon initiation a backwash operation, the fluid pressure at a point downstream of the filter body to the displaceable member in the direction causing the valve member to reduce the flow of the fluid to the housing outlet.

9. The filter according to claim 8,
wherein said filter housing includes an outer section and an inner tubular section formed with inlet openings communicating with the housing inlet, outlet openings communication with the housing outlet, and a deflector between the two openings constraining the fluid to flow from the inlet opening through the filter body and then through the outlet opening; said filter body being of cylindrical configuration and rotatably mounted on said inner tubular section over said outlet openings.

10. The filter according to claim 9, wherein said inner tubular section includes a main rigid pipe threadedly receiving an outer rigid pipe on each of its two opposite ends; said filter body being rotatably mounted on said inner rigid pipe by a rotary-bearing seal provided at each of the ends of the main rigid pipe and clamped thereto by the outer rigid pipes threaded thereon.

11. The filter according to claim 10, wherein said main rigid pipe is integrally formed with an annular shoulder on each of its two ends, each of the rotary-bearing seals being pressed against said annular shoulders by the threaded attachment of said end pipes to said main pipe.

12. The filter according to claim 11, wherein said two rotary-bearing seals comprises a conical plastic disc seal and a retainer ring, the retainer ring being received on the side of the rotary-bearing seal engaging said annular shoulders of the main rigid pipe and including a hard annular surface rotatably supporting said filter body while said plastic disc seal engages said filter body to effect a seal with respect thereto during the rotation of the filter body.

13. A backwashable filter including a housing having an inlet connectable to an upstream fluid pipe and an outlet connectable to a downstream fluid pipe, a filter body having an upstream surface facing the housing inlet, a backwash nozzle within the housing and having an inlet disposed adjacent to the upstream surface of the filter body, and a control device for sensing the pressure drop across the filter body and effective, upon sensing a pressure drop of a predetermined magnitude, to initiate a backwashing operation by connecting the backwash nozzle to the atmosphere and rotating the filter body with respect to the backwash nozzle; characterized in that said filter housing includes an outer section, an inner tubular section formed with inlet openings communicating with the housing inlet and outlet openings communicating with the housing outlet, and a deflector between the two openings constraining the fluid to flow from the inlet openings through the filter body and out through the outlet openings; said tubular housing section including a main rigid pipe threadedly receiving an outer rigid pipe on each of its opposite ends; said main rigid pipe having integrally formed thereon an annular shoulder on each of its two opposite ends; and a rotary-bearing seal clamped between said annular shoulder on each of the two ends of the main rigid pipe and the outer pipes when threadedly attached thereto, each of said rotary-bearing seals comprising a conical plastic disc seal and a retainer ring, each of the retainer rings being received on the side of the rotary-bearing seal engaging the respective annular shoulder of the main rigid pipe and including a hard annular surface rotatably supporting said filter body while said plastic disc seal engages said filter body to effect a seal with respect thereto during the rotation of the filter body.

14. The filter according to claim 13, wherein said rotatable filter body is mounted on an open cylindrical cage which spaces the filter body from the outer face of the main rigid pipe, said cage including end walls formed with a first smooth annular surface engaged by the retainer ring of the respective rotary-bearing seal, and with a second smooth annular surface, of larger diameter than that of said first smooth annular surface, engaged by the conical plastic disc of the respective rotary-bearing seal.

15. The filter according to claim 14, wherein one end wall of said open cylindrical cage is formed with teeth for rotating the cage and the filter body supported thereby with respect to the backwash nozzle during a backwash operation.

16. A backwashable filter including a housing having an inlet connectable to an upstream fluid pipe, and an outlet connectable to a downstream fluid pipe, a filter body having an upstream surface facing the housing inlet, a backwash nozzle within the housing and having a nozzle inlet disposed adjacent to the upstream surface of the filter body, and a control device for initiating a backwash operation by connecting the backwash nozzle to the atmosphere, said control device including a housing, a displaceable member displaceable within the latter housing in response to the drop in pressure across said filter body, and a manipulatibe member coupled to said displaceable member and passing through an opening in said control device housing so as to be manually movable from a home position to a plurality of actuated positions including a first position wherein it initiates a backwash operation and a second position wherein it terminates the backwash operation; said manipulatible member including a stem having its outer end projecting through the opening in the control device housing, and its inner end movable with respect to a valve opening in a wall within said housing, such that the inner end of the stem closes said valve opening in the home position of the manipulatible member, and recloses said valve opening in the second actuated position of the manipulatible member.

17. The filter according to claim 16, wherein said manipulatible member is spring-biased to said home position when the filter performs its normal filtering function, from which home position the manipulatible member may be manually actuated to said first position to initiate a backwash operation, or to said second position to terminate the backwash operation.

18. The filter according to claim 17, wherein said manipulatible member is spring biased to said home position when the pressure drop across the filter body is below a first predetermined magnitude, but is automatically moved to said first actuated position when the pressure drop rises to said first predetermined magnitude, and to said second actuated position when the pressure drop rises to a second, higher, predetermined magnitude.

19. The filter according to claim 16, wherein said stem includes an inner section of the same cross-sectional area as said valve opening so as to close same when the stem is in said home position, a second section of smaller cross-sectional area than said valve opening so as to open same when the manipulatible member is in said first actuated position, and a third section at least of the same cross-sectional area as said valve opening so as to reclose same when the manipulatible member is in said second actuated position.

20. The filter according to claim 19, wherein said wall in the control device housing formed with said valve opening divides the interior of the control device housing into at least two compartments, said first-mentioned displaceable member being displaceable in one of said compartments, the other compartment including a second displaceable member movable therein in response to the movement of said stem to said first actuated position, thereby permitting fluid flow through said valve opening from said first compartment to said second compartment, said second displaceable member being movable from a first position adjacent said wall to a second position remote from said wall, said second displaceable member including a further stem carrying a second valve member effective to connect the backwash nozzle to the atmosphere when said second displaceable member is moved to said second position.

21. The filter according to claim 20, further including a valve assembly within the filter housing and automatically movable to open or restrict a passage between the downstream side of the filter body and the filter housing outlet in response to the drop in pressure across said filter body.

22. The filter according to claim 21, wherein said valve assembly includes a spring urging said displaceable member in the direction causing said valve member to reduce the flow to the housing outlet, and means controlled by said control device for applying, upon initiating of a backwash operation, the fluid pressure at a point downstream of the filter body to the displaceable member in the direction causing its valve member to reduce the flow of the fluid to the housing outlet.

23. The filter according to claim 21, where said second displaceable member is a piston movable within a cylinder and defining an expansible chamber with said control device wall formed with said valve opening.

24. The filter according to claim 23, wherein said piston includes a control member effective to establish communication between said expansible chamber on one side of said piston, and the chamber on the opposite side of said piston when the piston is in its extreme extended position wherein said expansible chamber is at maximum volume, and to block communication between said two chambers when the piston is in its extreme retracted position wherein said expansible chamber is at minimum volume, the chamber on said opposite side of the piston including a vent to the atmosphere.

25. The filter according to claim 24, wherein said control member is in the form of a sleeve displaceable in said piston, said sleeve being open at the end opposite to said control device wall formed with said valve opening, and being closed at the end facing said wall but including a radially-extending bore adjacent to said latter end; the chamber at the side of said piston opposite to that of said partition wall including a slow-acting venting opening, a surface effective to close the open end of the sleeve when the piston is in its extreme extended position wherein the chamber between it and the partition wall is at maximum volume, and a spring biasing said piston away from said latter surface, whereby said venting opening enables said spring to move the piston away from said latter surface to open the respective end of the sleeve, thereby venting said chamber between the piston and said wall to the atmosphere via said sleeve and said radially-extending bore therethrough.

* * * * *